(12) United States Patent
Hurst et al.

(10) Patent No.: US 7,505,760 B2
(45) Date of Patent: Mar. 17, 2009

(54) METHOD AND APPARATUS FOR THE SUPERDISTRIBUTION OF CONTENT IN A NETWORK INCLUDING STATIONARY AND MOBILE STATIONS

(75) Inventors: Leon Hurst, Helsinki (FI); Peter K. Chiu, Nahsua, NH (US)

(73) Assignee: Nokia Corporation, Espoo (FI)

( * ) Notice: Subject to any disclaimer, the term of this patent is extended or adjusted under 35 U.S.C. 154(b) by 1076 days.

(21) Appl. No.: 09/977,696

(22) Filed: Oct. 16, 2001

(65) Prior Publication Data

US 2004/0198308 A1 Oct. 7, 2004

Related U.S. Application Data

(60) Provisional application No. 60/303,157, filed on Jul. 6, 2001.

(51) Int. Cl.
*H04Q 7/20* (2006.01)
*G06Q 99/00* (2006.01)

(52) U.S. Cl. .................... 455/414.1; 455/414.3; 705/81
(58) Field of Classification Search ................ 455/403, 455/414.1, 414.3, 414.4, 435.1, 406–407, 455/411, 426.1, 556.1, 41.2; 380/277; 705/5, 705/51, 54, 26–27, 57
See application file for complete search history.

(56) References Cited

U.S. PATENT DOCUMENTS

| 4,114,139 A | 9/1978 | Boyd et al. |
| 4,227,253 A | 10/1980 | Ehrsam et al. |
| 5,287,407 A | 2/1994 | Holmes |
| 5,381,480 A | 1/1995 | Butter et al. |
| 5,509,070 A | 4/1996 | Schull |
| 5,673,316 A * | 9/1997 | Auerbach et al. ............. 705/51 |
| 5,930,801 A | 7/1999 | Falkenhainer et al. |
| 5,999,622 A * | 12/1999 | Yasukawa et al. ............. 705/51 |
| 6,055,314 A | 4/2000 | Spies et al. |
| 6,185,683 B1 | 2/2001 | Ginter et al. |
| 6,223,287 B1 | 4/2001 | Douglas et al. |
| 6,226,618 B1 | 5/2001 | Downs et al. |
| 6,385,596 B1 | 5/2002 | Wiser et al. |
| 7,249,029 B2 | 7/2007 | Martin et al. |
| 2001/0018660 A1* | 8/2001 | Sehr .............................. 705/5 |

(Continued)

FOREIGN PATENT DOCUMENTS

EP     1081616 A2 *  3/2001

(Continued)

OTHER PUBLICATIONS

Rosenberg et al., "SIP Extensions for Presence," Mar. 30, 2001, pp. 1-39.

Communication from European Patent Office for Application No. 02801448.8, received Sep. 22, 2008, 5 pages.

(Continued)

*Primary Examiner*—Pablo N Tran
(74) *Attorney, Agent, or Firm*—Banner & Witcoff, Ltd.

(57) ABSTRACT

A method and apparatus for the superdistribution of content on a network having a plurality of terminals for permitting a user of a terminal to superdistribute content stored in the terminal to another terminal and permitting the other user of the other terminal to inspect and purchase the content if desired. The invention provides an easily used mechanism that allows for the superdistribution of content from user to user to aid in the widespread distribution of content among users of various types of terminals including mobile terminals.

27 Claims, 4 Drawing Sheets

U.S. PATENT DOCUMENTS

| | | |
|---|---|---|
| 2001/0025269 A1 | 9/2001 | Otsuka |
| 2002/0059144 A1 | 5/2002 | Meffert et al. |
| 2002/0184156 A1 | 12/2002 | Tadayon et al. |
| 2002/0198843 A1 | 12/2002 | Wang et al. |

FOREIGN PATENT DOCUMENTS

| | | |
|---|---|---|
| WO | WO 98/11744 | 3/1998 |
| WO | WO 00/28539 | 5/2000 |
| WO | WO 00/36857 | 6/2000 |
| WO | 0116821 | 3/2001 |
| WO | WO 01/6671 A1 | 3/2001 |

OTHER PUBLICATIONS

Marc A. Kaplan, "IBM Cryptolopes, SuperDistribution and Digital Rights Management", Retrieved from <http://www.research.ibm.com/people/kaplan/crytolope-docs/crypap.html>, on Mar. 14, 2000.

J. Gemmell et al., "Fcast Multicast File Distribution", IEEE Network, IEEE Service Center, New York, NY, US, vol. 14, No. 1, Jan. 1, 2000, pp. 58-68, XP001195290.

R. Mori et al., "Superdistribution: The Concept and the Architecture", Transactions of the Institute of Electronics, Information and Communication Engineers of Japan, Inst. of Electronics & Communic. Engineers of Japan, Tokyo, JP, vol. E73, No. 7, Jul. 1, 1990, pp. 1133-1146, XP000159229.

* cited by examiner

METHOD AND APPARATUS FOR THE SUPERDISTRIBUTION OF CONTENT IN A NETWORK INCLUDING STATIONARY AND MOBILE STATIONS

CROSS-REFERENCED TO RELATED APPLICATIONS

The present application claims the benefit of U.S. Provisional application Ser. No. 60/303,157, filed Jul. 6, 2001, entitled "A METHOD, SYSTEM AND COMPUTER PROGRAM FOR CONTROLLING THE DISTRIBUTION OF A DIGITAL ASSET IN A MOBILE ENVIRONMENT" by L. Hurst, et al., and relates to application Ser. No. 09/511,237, filed Feb. 23, 2000, entitled "SYSTEM AND METHOD OF SECURE PAYMENT AND DELIVERY GOODS AND SERVICES," by M. Zilliacus; and application Ser. No. 09/659,781, filed Sep. 11, 2000, entitled "SYSTEM AND METHOD OF BOOTSTRAPPING A PUBLIC KEY INFRASTRUCTURE FOR SECURE PAYMENT OF GOODS AND SERVICES USING A MOBILE TERMINAL", by P. Ginzboorg, the contents of each being incorporated herein by reference.

BACKGROUND OF THE INVENTION

The present invention is directed to a method and apparatus for distributing content in a telecommunications network. More particularly, the present invention is directed to a method and apparatus to support superdistribution of Digital Rights Management (DRM)-protected content among various terminals including desktop computers, mobile communication devices and intelligent home appliances, all of which have appropriate apparatus for processing and/or outputting the content and connectivity to the Internet, and the customization of the features of the content when downloaded to the terminals based on profile information of the terminals.

Today, there is enormous demand for digital content, in particular digital music in Motion Picture expert group version 3 (MP3) and other formats, to be downloaded from the Internet for entertainment or other purposes. The major enablers of this widespread phenomenon include advances in Internet technology, advances in apparatus for processing and/or outputting digital content including digital audio technology, and the availability of intelligent devices that support digital computing and communication.

Consumers enjoy easy access of digital content over the Internet. They can easily spread their experience to their family, friends and colleagues, by making soft-copies of the downloaded digital content, or by relaying the URLs of the content source over the Internet. This kind of referencing activity can be used as a powerful tool for promoting new products, in parallel with commercial advertisement.

However, the lack of appropriate DRM-protected superdistribution solutions is hindering the growth of this new business model. On one hand, content publishers want to protect the copyrights of their digital content, so that they can be fairly compensated for providing the services. On the other hand, they do not want to make it difficult for consumers to access their digital content and to share their experience with their peers. In addition, there are as many interested groups as there are interested individuals, and it is inefficient if not impossible to try to manage superdistribution of such disparate groups and individuals in a centralised manner.

Various apparatuses, systems and methods have been proposed for distributing digital content including copyrighted material through a telecommunications network, particularly a cellular network. These proposed apparatuses, systems and methods have attempted to control the distribution of the content to ensure that the originator of the content is paid for each copy. Such apparatuses, systems and methods, for example, have operated using encryption techniques where a key is provided to the purchaser of the encrypted content to permit only the purchaser to decrypt the encrypted content.

The actual distribution of such digital content has been accomplished using many different types of telecommunication techniques including using, for example, the Short Message Service (SMS) facilities of a cellular network or the Instant Messaging (IM) technology of an Internet Protocol (IP) network. Using the SMS facilities of a cellular network or the IM technology of an IP network allows for the quick distribution of content to a purchaser operating a network terminal without extensive overhead. The SMS facilities of a cellular network are particularly useful in distributing content such as ring tone data, voice mail, display screens, and the like for use by a terminal. Payment for the content is accomplished, for example, by charging the account the user maintains with the service provider operating the cellular network or by credit/debit card.

Although the above described apparatuses, systems and methods sufficiently handle the distribution of content from the originator/seller of the content to a user and the collection of payments for the content, they are not intended to address the issues associated with superdistribution of content from user to user. The superdistribution of content from user to user often contributes to making content that may have been somewhat popular into content that is widely used and very popular. Superdistribution relies on the actions and excitement of users rather than traditional systems and marketing methods.

One of the major issues associated with superdistribution is controlling such distribution so that the user receiving content, paid for by another user, cannot use the content beyond that needed to inspect the content so as to contemplate purchasing the content. Other issues associated with superdistribution are providing a mechanism to transmit the content from one terminal to another terminal, providing a mechanism to permit the user of the other terminal to purchase the content if desired, and providing a mechanism for permitting the customization of the features of content, that has been downloaded to a device, to the capabilities and functions of the device.

Accordingly, there is a need for a system and method that allows adequate protection of digital content from piracy, participation of individual consumers in the media superdistribution process, and the hierarchical management of superdistribution communities.

Further there is a need for a system and method that permits a user of a terminal in a network to superdistribute content to the terminal of another user and allow the other user of the other terminal to inspect and purchase the content prior to the content being permanently stored in the other terminal.

Still further, there is a need for a system and method that effects the superdistribution of content from a terminal of a user to another terminal of another user without intervention of the network. Only when the other user of the other terminal has inspected the content and indicated a desire to purchase the content should the network intervene.

Still further yet, there is a need for a system and method that effects the customization of the features of content, that has been downloaded to a device, to the capabilities and functions of the device.

Even further still there is a need for a system and method that allows for a terminal to implement business methods based on the superdistribution of content.

SUMMARY OF THE INVENTION

The present invention provides method and apparatus that supports the superdistribution of DRM-protected content among intelligent devices within a telecommunications network including, for example, a virtual community, the customization of the features of content according to profile information of the devices when the content is downloaded to the devices, and permitting users through their devices to implement business methods based on the superdistribution of content. This invention covers various categories of intelligent devices that are equipped with appropriate processing and/or output apparatus for processing and/or outputting the digital content including for example a digital audio player for outputting digital audio content as well as Internet connectivity.

The present invention provides a superdistribution federation model that integrates DRM technology with, for example, the SMS facilities of a cellular network or IM technology of an IP Network. The superdistribution federation model of the present invention performs the steps of registering individual consumers, with similar interest in digital content, to a superdistribution community server; using a superdistribution community server to host multiple interest groups, track the status of the members, track profiles of the devices used by the members of the community, track account activity of the members of the communities, manage DRM deployment within the community, and aggregate charging and usage records for superdistribution transactions within the community; using a superdistribution federation server to manage a group of superdistribution community servers, provide services including collection of charging and usage records from different communities, interface with a charging center, and deploy a DRM among community servers using technology such as global encryption key assignment; and originating digital content from a physical storage (e.g. Compact Disc (CD)) from the Internet without DRM protection, and from the Internet with DRM protection The community member that introduces digital content to the superdistribution community is responsible for packaging the content in a DRM-protected manner. This originating community member multicasts alerts of new content arrivals and offers other such content to other community members. The multicasting of such alerts from the originating community member to the other community members is conducted based on pre-stored status information. The Community members, who are interested to receive a sample clip or accept the offer, can contact the originating community member to download the content to the devices being used by the interested community members. The downloading of the features of the content to the devices being used by the interested community members is conducted based on profile information of such devices stored in the superdistribution community server. The profile information allows for the customization of the features of the content according to the capabilities and known functions of a particular device to which the content is to be downloaded.

The present invention also provides a method and apparatus for the superdistribution of content in a telecommunications network, particularly a cellular network having a plurality of terminals. The present invention permits a user of a terminal to superdistribute content stored in the terminal to another terminal so that the other user of the other terminal can inspect and purchase the content if desired. Thus, the present invention allows for the superdistribution of content from user to user in a telecommunications network to aid in the widespread distribution of content among users of terminals in the telecommunications network, particularly mobile terminals in a cellular network.

According to the present invention content is transmitted from the first terminal to the second terminal. This transmission can occur, for example, outside of the network on a direct link established between the first terminal and the second terminal. This direct link could, for example, be a link established according to the Bluetooth Standards and Protocols, an infrared communications link, a wireless communications link, a physical serial connection, etc. Alternatively, this transmission could occur across, for example, an IP network or a cellular network but may involve additional charges by the Service Provider.

The second terminal receives the content transmitted from the first terminal and temporarily stores the content in the second terminal in a manner to permit the content to be inspected by the second user. The content could, for example, be music, tone data to be reproduced by the terminal, information such as screen savers, screen images, logos, icons, or the like to be displayed on the display of the terminal. Further, the content could, for example, be software, which causes the terminal to operate in a particular manner. Any number of items and information could be packaged as content for sell and super-distribution among users in a cellular network.

Once the content has been temporarily stored in the second terminal, the second user inspects the content. After inspecting the content the second user is then allowed to purchase the content if desired. If the second user does not desire to purchase the content, then the content is automatically discarded. This automatic discarding is to prevent the second user from unauthorized use of the content. Once the second user purchases the content, then the content including its features is permanently stored in the second terminal based on profile information of the second terminal. The profile information allows for the customization of the features of the content to take advantage of the capabilities and functions of the second terminal.

BRIEF DESCRIPTION OF THE DRAWINGS

The scope of the present invention will be apparent from the following detailed description, when taken in conjunction with the accompanying drawings, and such detailed description and specific examples, while indicating example embodiments of the invention, are given by way of illustration only, since various changes and modifications within the spirit and scope of the invention will become apparent to those skilled in the art from this detailed description in which.

DETAILED DESCRIPTION OF THE INVENTION

The method and apparatus of a superdistribution federation model according to the present invention and the method and apparatus for implementing superdistribution in a telecommunications network, particularly a cellular network, according to the present invention are illustrated in FIGS. 1-4. It should be noted that the embodiments forming the invention as illustrated in FIGS. 1-4 are each merely representative of one of numerous embodiments that fall within the scope of the claimed invention. Thus, the present invention is not limited in any way to the embodiments illustrated in FIGS. 1-4. Also it should be noted that the cellular network illustrated in FIGS. 3 and 4 can be replaced by an IP network or any other type of network that allows communications between terminals. Using an IP network or any other type of network that allows communications between terminals in place of the cellular network will not affect the overall concept and implementation of the present invention. It should be further noted that either of the methods or apparatus for implementing a superdistribution federation model or implementing superdistribution in a telecommunications network can form part of business methods conducted by the users of the terminals based on the superdistribution of content. Such business methods could for example be the periodic superdistribution of content, generated by the user of a terminal, to subscribers of the content and/or users of other terminals who respond to offers to purchase the content.

Figure 1:
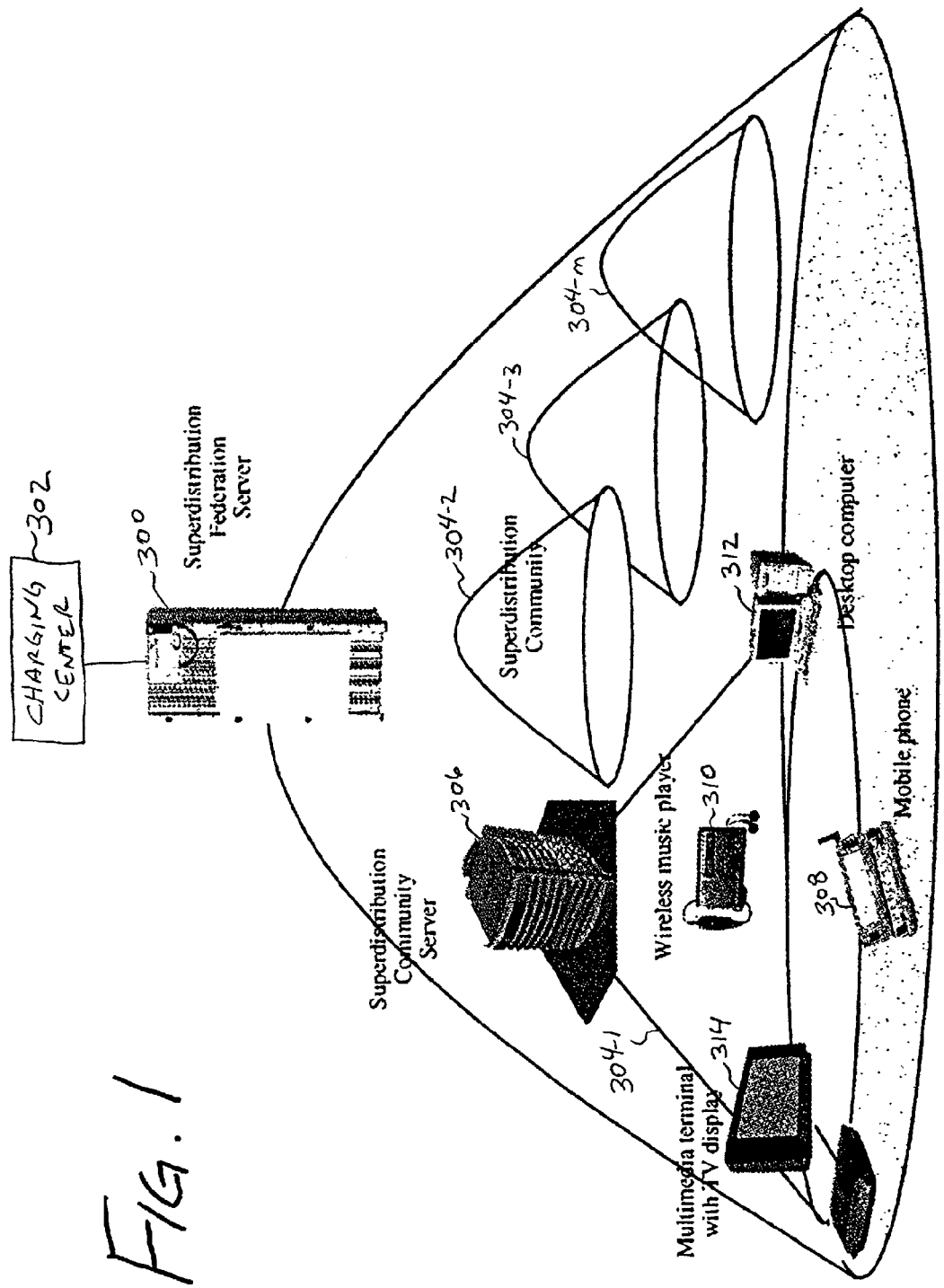
FIG. 1 is a schematic diagram illustrating the elements of a superdistribution federation model of the present invention.
Figure 2:
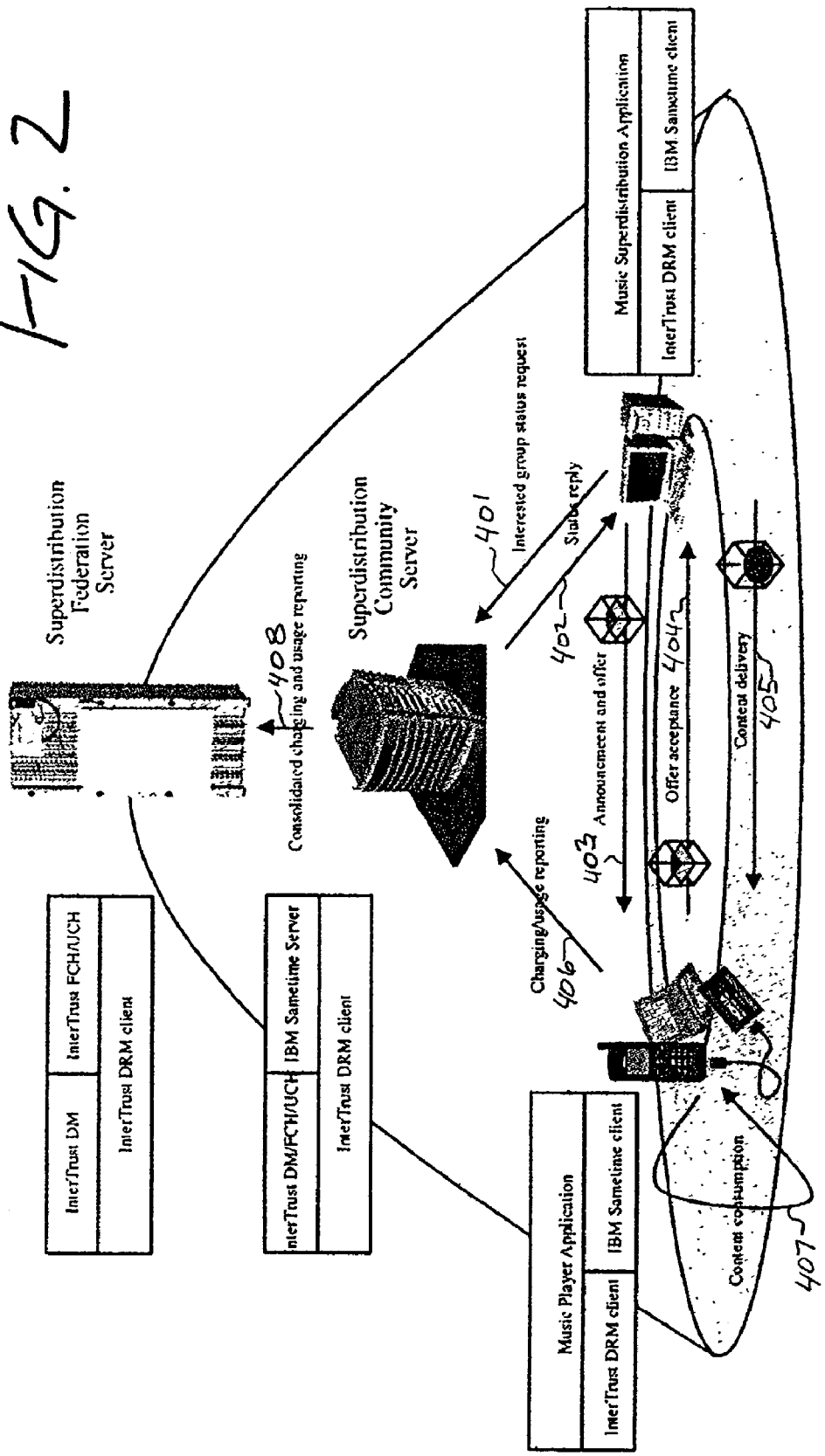
FIG. 2 is a schematic diagram illustrating the steps performed by the elements of the superdistribution federation model of the present invention to implement superdistribution of content.

With reference to FIGS. 1 and 2 the superdistribution federation model provides a federation server that governs a group of communities. Each community has a dedicated superdistribution server. Each superdistribution community server can host one or more interested groups. Each interested group can contain one or more community members that share the same interest in a specific category of digital content. Each community member may have one or more superdistribution-enabled devices. Digital content packaged by a community member can be superdistributed to other community members of the same group or other groups by the superdistribution community server and the superdistribution federation server.

As per FIGS. 1 and 2 there is at least one superdistribution federation server 300 in a superdistribution federation. The superdistribution federation server 300 performs the functions of collecting charging and usage records from different communities and passing them to a charging center 302, and managing DRM deployment within the federation such as superdistribution community server deployment and global encryption key management. The superdistribution federation can include a standby superdistribution federation server to ensure reliability and availability of the entire system.

Each superdistribution community 304, of plural superdistribution communities 304-1 to 304-*n* of the superdistribution federation, is managed by a superdistribution community server 306. The superdistribution community server 306 performs the functions of hosting one or more interested groups, performing registration and deregistration of community members, tracking the status of members related to superdistribution, tracking profile information of devices used by the community members to permit the customization of the features of content when stored in the devices, managing DRM client deployment within the community, and aggregating charging and usage records within the community and passing them to the superdistribution federation server 300 which passes them on to the charging center 302.

Each interested group included in a superdistribution community 304 can have one or more community members sharing the same interest in a specific category of digital content. A community member can participate in one or more interested groups.

Each community member may operate one or more terminal devices, that have the capabilities of connectivity to the Internet, ability to process and/or output digital content of the appropriate format, and ability to perform operations on DRM-protected digital content. The ability to process and/or output digital content can, for example, be provided by a digital audio player, a browser, particular hardware/software drivers, etc. This processing and/or outputting could include operations such as outputting sound, displaying images, and storing and/or executing software.

Examples of superdistribution devices include mobile phones 308 with data capability, music players 310 with wireless modem, desktop computers 312 with Internet connectivity, multimedia terminals 314 with Internet connectivity. Any other devices now known such as PDA, mobile phones, data interfaces or device now unknown can also be used so long as such devices have the above-described capabilities.

Before being allowed to participate in any superdistribution activity, an individual is required to register with a superdistribution community server 306. The registration process includes the steps of installing a compliant processing/outputting apparatus, which is both DRM-enabled and SMS and/or IM-enabled, on the device if there is no such processing/outputting apparatus already installed, setting up a user account with unique user identification (ID) and device ID, installing automatically DRM encryption/decryption key(s) on the device by the superdistribution community server 306, and creating or specifying the interested group(s) to join. At the time of registration profile information of the device is generated based on the capabilities and functions of the device and stored in the superdistribution community server. The profile information is used at the time of downloading content to the device to customize the features of the content to the capabilities and functions of the device.

Individual community members have the capability to introduce new digital content into the superdistribution pool of content. This capability implies the features of the ability to process a source of material (e.g. CD) to form digital content of a specific format (e.g. MP3, Advanced Audio Coding (AAC)), the ability to transform raw digital content into a DRM-protected format, and the ability to specify usage rules or offers associated with the digital content (e.g. charge individual $0.10 to publish, charge individual $0.10 to superdistribute content). This capability can, for example, be implemented though the superdistribution-enabled device of the community member or any other such device wherein this capability has been installed.

Each superdistribution community server 306 keeps track of the profiles of the device(s) used by individual community members by storing profile information of such device(s) and keeps track of the superdistribution statuses of individual community members within the community for reference when delivering information including content to the community members of the interested group. Each community member has the ability to update the profile information of the device(s) used by the community member and update his/her superdistribution status dynamically to any one of a plurality of different statues. The profile information includes information such as the type of device being used, the capabilities of the device, any unique functions of the device, etc. The various superdistribution statuses include statuses such as no interest for any new content announcement, interest in receiving new content announcement via, for example, IM, SMS, etc., interest in receiving new content announcement via email, interest in receiving new content announcement with sample clip, and interest in receiving new content announcement with detailed content description.

When a community member is ready to introduce new content to the superdistribution pool of content within the community, he/she obtains superdistribution status information of the community members of the interested group by issuing an interested group status request (step 401) to the superdistribution community server 306. The superdistribution community server 306 checks the superdistribution statuses of the community members of the interested group and sends a status reply to the community member who originated the request indicating such statuses (step 402). The community member who originated the interested group status request, based on the statuses indicated in the status reply, issues a new content announcement (step 403) that is multicast to the community members of the interested group in a manner according to their respective statuses as indicated in the status reply. This announcement contains the title and brief description of the content (e.g. creator, published date, format, targeted interested groups) and the offer. For financial reasons, new content announcements are also encrypted. When a community member receives a new content announcement, he/she has the option to accept or decline the offer, and an acknowledgement is sent back to the offer originator directly (step 404) indicating the selected option.

A positive offer acknowledgement causes the community member who originated the offer to download a DRM-protected version of the requested content to the device of the community member who originated the positive acknowledgement (step 405). Prior to downloading the content to the device of the community member who originated the positive acknowledgement, the community member who originated the offer obtains profile information of the device from the superdistribution community server. The profile information is used to customize the features of the content to take advantage of the capabilities and functions of the device of the community member who originated the positive acknowledgement. Thereafter the customized content is downloaded to the device of the community member who originated the positive acknowledgement.

Instead of downloading content to the device of the community member who originated the positive acknowledgement, the community member could for example be provided multiple offers or a plurality of selectable items of content. The community member who originated the positive acknowledgement can then select one of the offers or selectable items of content for downloading and the selected offer or item of content is then downloaded.

The multiple offers and selectable items of content could for example be embedded with a SMS service number in Meta Data included in the multiple offers and selectable items of content. This SMS number in the Meta Data could for allow for other functionalities to be implemented in the terminal such as one-click buying upon receipt of the multiple offers and selectable items of content For example, the multiple offers and selectable items of content could include a song, which is the item of interest and a Meta data portion. When the file containing the song is opened, a question and response script is executed due to the Meta data, requiring the user to answer yes or no to specific questions. A YES means that user accepts that his terminal will send an SMS to a specified number and the user's account will be charged by a predetermined fee according to information included in the meta data portion. A NO means that the user does not want to purchase the song.

Once the content has been downloaded to the device of the community member who originated the positive acknowledgement, a content purchase transaction between the community member and the superdistribution community server 306 is triggered (step 406). The community member now having purchased the content can freely consume the content in the device to which the content was downloaded (step 407). Upon purchase of the content, the community member who originated the content is compensated through his account by one of payment, discount, rebate, credit, etc. The superdistribution community server 306 periodically or in response to the superdistribution federation server 300 sends a consolidated charging and usage report to the superdistribution federation server 300 including a report of the above described transaction (step 408).

There are many alternative ways to implement each of the elements of the superdistribution federation model of the present invention described above. The superdistribution federation server 300 can be implemented using an extended DRM deployment platform (e.g. InterTrust Deployment Manager) integrated with a financial/usage clearing house gateway (e.g. InterTrust Financial/Usage Clearing House). The superdistribution community server 306 can be implemented using an extended DRM deployment platform (e.g. InterTrust Deployment Manager) integrated with an IM server (e.g. IBM sametime server) and a financial/usage record aggregator (e.g. InterTrust Financial/Usage Clearing House). The superdistribution member client can be implemented using an extended DRM client (e.g. InterTrust DRM client) integrated with IM client functionality (e.g. IBM sametime client).

Figure 3:
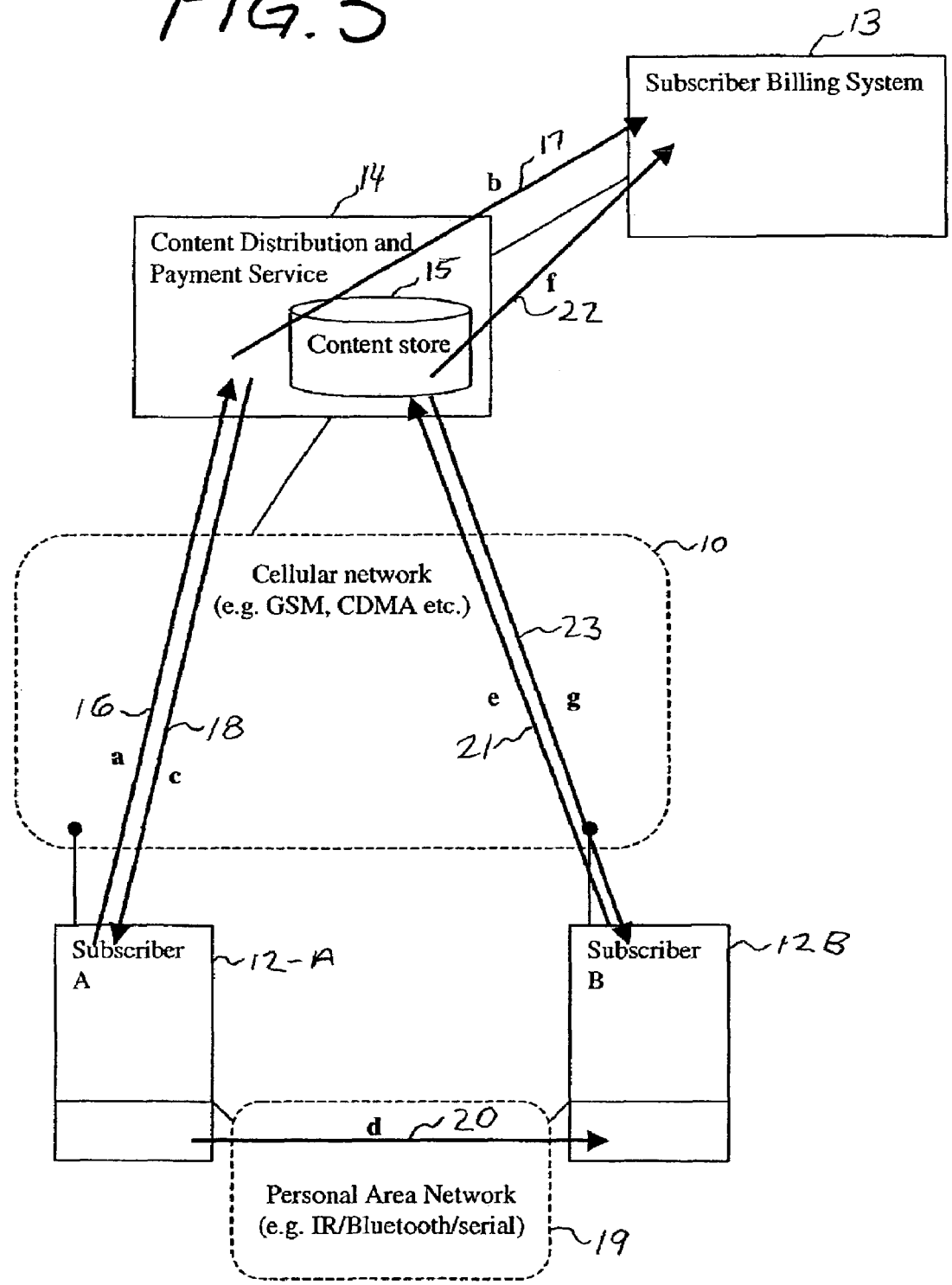
FIG. 3 is a schematic diagram illustrating the elements and steps performed to cause superdistribution of content in a telecommunication network particularly a cellular network according to the present invention.
Figure 4:
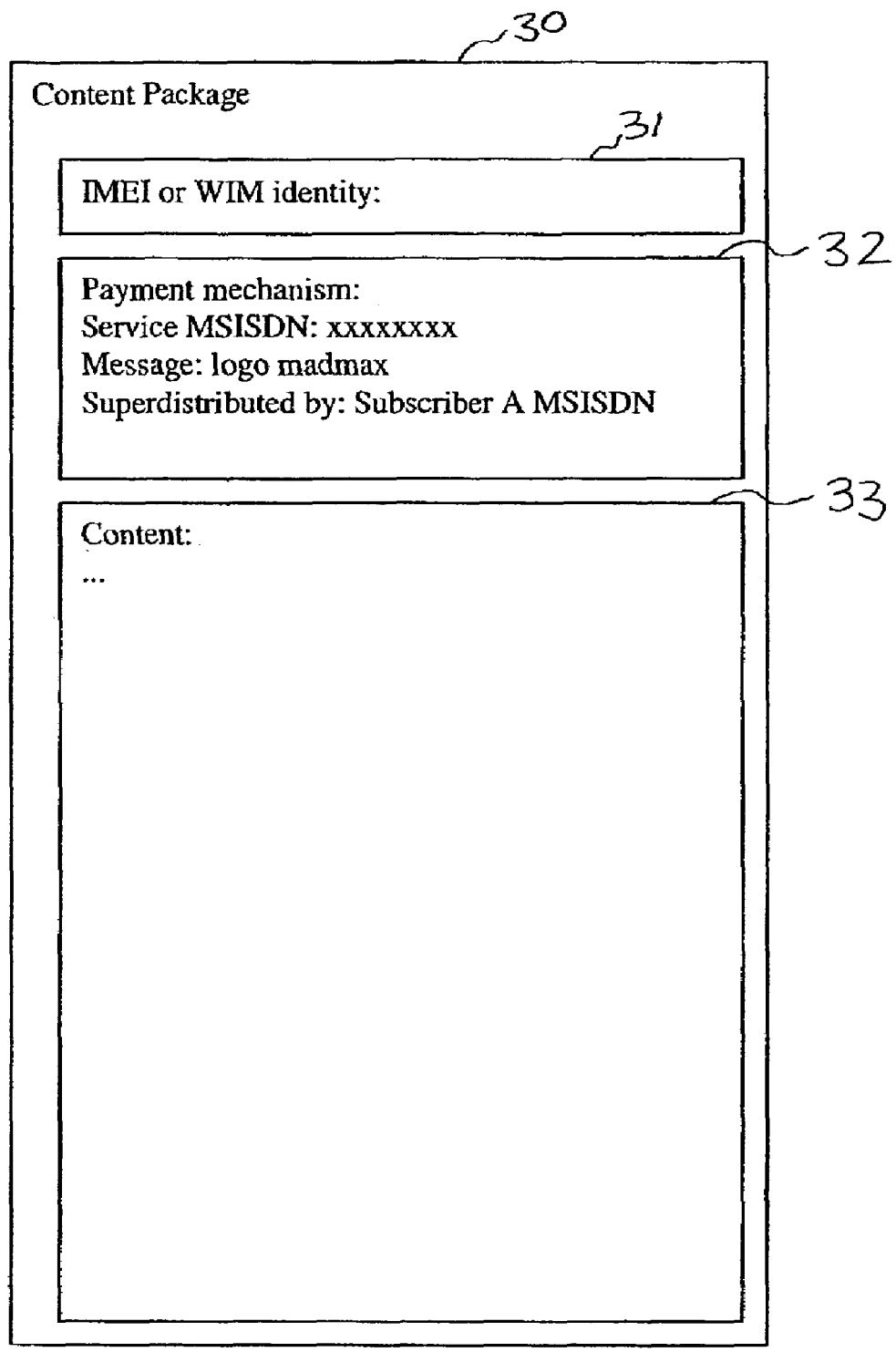
FIG. 4 is a schematic diagram illustrating the content package used to distribute the content.

With reference to FIGS. 3 and 4, the method and apparatus for the superdistribution of content in a telecommunications network provides a network, particularly a cellular network 10, having a plurality of terminals 12-A, 12B each being operated by a subscriber, namely, subscriber A and subscriber B respectively. Each subscriber uses the services provided by the service provider via the cellular network 10. The services and any other costs incurred by each subscriber are accounted for and billed to the subscriber by use of a subscriber billing system 13. As per the above the cellular network 10 can be replaced by an IP network or any other type of network that allows communications between terminals. Such a network would not affect the overall concept and implementation of the present invention.

The cellular network 10 could be of any type, for example, Global System for Mobile communications (GSM), Code Division Multiple Access (CDMA), etc. The cellular network 10 provides wireless telecommunication services between subscribers and content providers. These telecommunication services could, for example, include Short Message Service (SMS) provided by SMS facilities (not shown) included in the cellular network, Internet access according to the Internet Protocol (IP), Email, Voice Mail, etc.

As per the above, the present invention is intended to allow for the conduct of superdistribution of content between users without necessarily requiring the intervention of the cellular network 10. This content could, for example, be music (MP3, etc.) ring tones, logos, pictures, screen images, animated messages, screen savers including animation, multi-media messages, etc.

The distribution of content between users without, for example, the intervention of the cellular network can greatly increase the potential users of particular content. The present invention aids the conduct of superdistribution without compromising the ability to collect payments on behalf of originators/distributors of the content. Further, the present invention allows for the receiver of the superdistributed content to inspect the content prior to purchasing such content If the receiver of the distributed content wishes to purchase the content, then steps involving the cellular network are performed.

The following is a description of the process of superdistributing content using the present invention as illustrated, for example, in FIG. 3. It should be noted that the process of superdistribution of the present invention requires communications to be performed between the terminals and the cellular network. Such communications tend to work best using the SMS facilities of the cellular network due to the low overhead of such messages. However, any other telecommunications technique provided by the cellular network can be used.

As illustrated in FIG. 3, the process begins by a first subscriber, in this case Subscriber A operating terminal A 12-A, purchasing and downloading content to his/her terminal from a content distribution and payment service 14 via the cellular network 10. The content distribution and payment service 14 includes storage 15 for storing content to be downloaded to terminals via the cellular network 10.

Subscriber A using Terminal A 12-A could, for example, request content such as the "mad max logo". This requesting of content is accomplished by the terminal A 12-A sending to the content distribution and payment service 14, via the cellular network 10, a communication 16, which could be an SMS message. The communication 16 identifies the "mad max logo" as content desired to be downloaded. The content distribution and payment service 14 in response to the communication 16 determines identification information such as the MSIDSN for terminal A 12-A from the received message. The content distribution and payment service 14 sends a communication 17, including the MSIDSN of terminal A 12-A, to the subscriber billing system 13 to cause the account of Subscriber A with the service provider to be charged for the content.

Once the charge is made to the account of Subscriber A, then the content distribution and payment service 14 retrieves from storage 15 the "mad max logo". The content distribution and payment service 14 then sends a communication 18 including the "mad max logo" as part of a content package 30, as illustrated in FIG. 4, to Terminal A 12-A. Terminal A 12-A upon receipt of the content package 30 included in communication 18 performs steps necessary to permanently store the content, in this case the "mad max logo" in the Terminal A 12-A.

The content package 30 could, for example, comprise various elements such as that illustrated in FIG. 4. The content package 30 as per FIG. 4 includes identification information 31 which, for example, could include IMEI or WIM identity information of the terminal that purchased the content, in this case terminal A 12-A. The content package 30 further includes payment/distribution information 32 regarding a payment mechanism used by Subscriber A to purchase the content, service MSISDN identifiers of the terminal, a title or brief description information of the content included in the package, superdistribution information so as to identify the purchaser of the content should the content package including the content be later superdistributed, and content 33.

It should be noted that the content 33 included in the content packet 30 could, for example, be encoded in such a way that it can only be permanently saved on terminal A 12-A. This, for example, could be achieved by including in the content 33 the IMEI or the WIM identifiers of the terminal being used by the subscriber, in this case terminal A 12-A. Subsequent superdistribution of the content 33 by Subscriber A using Terminal A 12-A is accomplished by transferring the entire content package 30 to another terminal.

As per the above, the intent of the present invention is to facilitate the superdistribution of content between users without necessarily involving the cellular network. For example, if Subscriber A wishes to distribute the content 33 just purchased as described above to a friend, namely, Subscriber B, then Subscriber A using, for example, a personal area network 19 existing between the two subscribers, transmits the entire content package 30 as part of a communication 20 from Terminal A 12-A to Terminal B 12-B.

The personal area network 19 could, for example, be a network or a link established according to the Blue Tooth Standard and Protocol, infrared communications signals, wireless communications signals, a physical connection, or the like. It should be noted that it is also possible to send the content package 30 from Terminal A 12-A to Terminal B 12-B via the cellular network 10. However, such a transmission may involve additional charges to the subscribers that may to some extent discourage superdistribution activities, which is contrary to the intent of the invention. The intent of the present invention is to make the conduct of superdistribution of content between users as easy as possible without incurring additional extra costs.

The content package 30 included as part of the communication 20 sent from Terminal A 12-A to Terminal B 12-B is temporarily stored in Terminal B 12-B in such a manner as to not permit it to be permanently stored in terminal B 12-B. Subscriber B using the Terminal B 12-B can then inspect the content 33 or a part of it included in the content package 30 e.g. by viewing the content 33 on the display of terminal B 12-B, listening to the content 33 as reproduced through the speakers, monitoring functions of the terminal B 12-B, or the like. Thus, Subscriber B is allowed to inspect the content 33 or a part of it, but is not allowed to permanently save the content in Terminal B 12-B.

If Subscriber B upon inspecting the content 33 determines that the content 33 is desired, then payment for the content 33 is to be effected. This payment for the content 33 would involve intervention from the cellular network 10.

One method of determining whether the content 33 in the content package 30 can be permanently stored in a receiving terminal, and whether payment is to be proffered for the content 33, is to compare the identification information 31 included in the content package 30 with the identification information of the receiving terminal. If the identification information 31 in the content package 30 is the same as the identification of the receiving terminal, then the subscriber of the receiving terminal can permanently store the content since the content has already been paid for. If the identification information 31 of the content package 30 and the identification information of the receiving terminal are not the same, then the receiving terminal can not permanently store the content and payment for the content must be proffered.

In the present situation since there is no match between the identification information 31 of the content package 30 and the identification information of Terminal B 12-B, the content 33 cannot be permanently stored in the Terminal B 12-B and payment for the content 33 must be proffered. Subscriber B is only allowed to inspect the content 33. In one embodiment of the invention, after the Subscriber B has inspected the content 33, Terminal B 12-B automatically presents a payment option to Subscriber B via the Terminal B 12-B. This payment option can, for example, be generated according to information previously stored in the content package 30. This payment option information could, for example, require the Terminal B 12-B to contact the content distribution and payment service 14 via the cellular network 10 in order to present payment for the content 33. This contacting of the content distribution and payment service 14 could, for example, be accomplished by use of SMS messages via the SMS facilities of the cellular network 10. Other types of telecommunication techniques could also be used.

Communication with the content distribution and payment service 14, via the cellular network 10, is initiated by Terminal B 12-B sending a communication 21 to the content distribution and payment service 14 via the cellular network 10. The communication 21 could include MSIDSN identification information of the Terminal B 12-B and information identifying the content 33 to be purchased. The communication 21 could also simply request the designated content 33 and proffer payment.

The content distribution and payment service 14 upon receipt of the communication 21 from Terminal B 12-B charges the account of Subscriber B for the content 33 by sending a communication 22 to the subscriber billing system 13. Subscriber billing system 13 bills the account of subscriber B maintained with the service provider.

In another embodiment of the invention the subscriber B sends with his Terminal 12-B a request for price to the content distribution and payment service 14 via the cellular network 10. The response of the content distribution and payment service 14 to Terminal B 12-B on this request is an offer, which is shown to the user of Terminal B 12-B. When the user of Terminal B 12-B decides to buy the offered content 33, the user sends a communication 21 to the content distribution and payment service 14.

The offer could for example be embedded with a SMS service number in Meta Data included in the offer. This SMS number in the Meta Data could for allow for other functionalities to be implemented in the Terminal such as one-click buying upon receipt of the multiple offers and selectable items of content For example, the offer could include a song, which is the item of interest and a Meta data portion. When the file containing the song is opened, a question and response script is executed due to the Meta data, requiring the user to answer yes or no to specific questions. A YES means that user accepts that his Terminal will send an SMS to a specified number and the user's account will be charged by a predetermined fee according to information included in the meta data portion. A NO means that the user does not want to purchase the song.

Upon purchase of the content, the user who originated the content can be compensated through his account e.g. by one of payment, discount, rebate, credit, etc. Once payment has been effected the content distribution and payment service 14 could then retrieve a new version of the content 33 from the storage 15. Thereafter, the content distribution and payment service 14 sends to the Terminal B 12-B, via the cellular network 10, a communication 23 including the new version of the content 33 as part of a new content package 30. The new version of the content 33 contained in the new content package 30 could, for example, include all of the information included in the content package 30 received from Terminal A 12-A, with the exception of the identification information 31 and the payment/distributor information 32 identifying the Terminal B 12-B rather than the Terminal A 12-A.

The features of the content 33 of the new version of the content 33 as retrieved by the content distribution and payment service 14 could be customized prior to transmission by the content distribution and payment service 14 based on prestored profile information indicating the capabilities and functions of the Terminal B 12-B. The prestored content information allows for the customization of the features of the content 33 to take advantage of the capabilities and unique functions of the Terminal B 12-B.

Alternatively, the communication 23 sent from the content distribution and payment service 14 to Terminal B 12-B could, for example, instruct Terminal B 12-B to perform steps necessary to change the content package 30 from Terminal A 12-A, now in its possession, to permit the permanent storage of content 33 in Terminal B 12-B. This communication could, for example, supply Terminal B 12-B with a permission key allowing it to change the contents of the identification information 31 of the content package 30 from Terminal A 12-A to identify Terminal B 12-B. The features of the content 33 included in the content package 30 could, upon receipt of the instructions from the content distribution and payment service 14, also be customized based on prestored profile information indicating the capabilities and function of the Terminal B 12-B prior to being permanently stored in Terminal B 12-B. The customized content 33 included in the changed content package 30 is then permanently stored in Terminal B 12-B.

Alternatively, instead of transmitting the content 33 to Terminal B 12-B, the content distribution and payment service 14 could for example provide multiple offers or a plurality of selectable items of content to the Terminal B 12-B. The user of Terminal B 12-B can select one of the offers or selectable items of content and then the selected content is sent to Terminal B 12-B.

Upon receipt of this new content package 30 from the content distribution and payment service 14, or alternatively the changing of the identification information 31 included in the content package 30 from terminal A 12-A, and upon customizing the features of the content 33 based on prestored profile information of Terminal B 12-B, the content 33 is permanently stored in the Terminal B 12-B since the identification information 31 included in the new or changed content package 30 matches the identification information of the Terminal B 12-B. Thereafter, the original superdistributed content package 30 distributed to Terminal B from Terminal A is discarded.

The above described steps of permitting the superdistribution of content between users can be further encouraged by allowing for a user who initiated the first purchase of the content and who superdistributed the content to another user, to receive some type of rebate, credit, discount, or payment for the superdistribution of a copy of the content to another user who later purchased the content.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method comprising:
    receiving, at a second terminal, a first content package including content from a first terminal through a network, wherein the first content package is stored on the second terminal in a manner that does not permit the permanent storage of the content on the second terminal, wherein the first and second terminals correspond to subscribers of a content distribution service;
    determining whether a received input corresponds to a request to purchase the content; and
    in response to determining that the received input corresponds to a request to purchase the content, permanently storing a copy of the content in said second terminal, wherein permanent storage of the copy is enabled by a second content package.

2. The method according to claim 1, wherein said network is a cellular telecommunications network.

3. The method according to claim 1, wherein permanently storing the copy of the content includes:
customizing the features of the copy based on prestored profile information, wherein the prestored profile information includes capabilities and functions of said second terminal; and
permanently storing the customized copy in said second terminal.

4. The method according to claim 1, wherein permanently storing the copy of the content includes:
retrieving identity information of the second terminal; and
permanently storing said identity information in said second terminal together with the received content.

5. The method according to claim 1, wherein the permanently stored copy is extracted from the second content package.

6. The method according to claim 5, wherein permanently storing the copy of the content includes:
customizing the features of the copy based on prestored profile information, wherein the prestored profile information includes capabilities and functions of said second terminal; and
permanently storing the customized copy in said second terminal.

7. The method according to claim 1, wherein the permanently stored copy is an altered version of the content received in the first content package.

8. The method according to claim 7, wherein permanently storing the copy of the content includes:
customizing the features of the copy based on prestored profile information, wherein the prestored profile information includes capabilities and functions of said terminal; and
permanently storing the customized copy in said second terminal.

9. The method according to claim 1, wherein a first user receives at least one of a discount, a rebate, a credit and a payment in response to determining that the received input corresponds to a purchase request.

10. The method according to claim 9, wherein permanently storing the copy of the content includes:
customizing the features of the content based on prestored profile information, wherein the prestored profile information includes capabilities and functions of said second terminal; and
permanently storing the customized content in said second terminal.

11. The method according to claim 1, wherein the second terminal receives, from the network, one or more offers associated with one or more selectable items of content in response to determining that the input corresponds to a request to purchase the content.

12. The method according to claim 11, further including receiving a selection of an item of content from one or more selectable items of content, wherein the selected item of content is permanently stored in said second terminal.

13. The method according to claim 12, wherein of the selected item of content is permanently stored by:
customizing the features of the selected item of content based on prestored profile information, wherein the prestored profile information includes capabilities and functions of said second terminal; and
permanently storing the customized selected item of content in said second terminal.

14. The method according to claim 1, wherein the first user of the first terminal is permitted to implement business methods based on a superdistribution of content in the telecommunications network.

15. An apparatus comprising:
a processor, and
memory configured to store computer readable instruction that, when executed by the process, cause the apparatus to perform a method comprising:
receiving a first content package including content from a terminal through a network, wherein the first content package is stored on the apparatus in a manner that does not permit the permanent storage of the content in the apparatus, wherein the terminal and the apparatus correspond to subscribers of a content distribution service;
determining whether a received input corresponds to a request to purchase the content; and
in response to determining that the received input corresponds to a request to purchase the content, permanently storing a copy of the content in an apparatus, wherein permanent storage of the copy is enabled by a second content package.

16. The apparatus according to claim 15, wherein said network is a cellular telecommunications network.

17. The apparatus according to claim 15, wherein said apparatus, when permanently storing the copy of the content, customizes the features of the copy of the content based on prestored profile information, wherein the prestored profile information includes capabilities and functions of said apparatus, and wherein the apparatus permanently stores the customized copy of the content.

18. The apparatus according to claim 15, wherein the second content package is received through the network and wherein the second content package enables permanent storage of the content.

19. The apparatus according to claim 18, wherein said apparatus customizes the features of the content based on prestored profile information, wherein the prestored profile information includes capabilities and functions of said apparatus, and permanently stores the customized content.

20. The apparatus according to claim 15, wherein said apparatus changes said content received from said terminal in a manner to permit said content to be permanently stored in said apparatus, and permanently stores the changed content in the apparatus.

21. The apparatus according to claim 20, wherein said apparatus customizes the features of the content based on prestored profile information, wherein the prestored profile information includes capabilities and functions of said apparatus, and permanently stores the customized content in the apparatus.

22. The apparatus according to claim 15, wherein in response to a determination that the received input corresponds to a request to purchase the content, receiving, at the terminal, at least one of a discount, a rebate, a credit, and a payment.

23. The apparatus according to claim 22, wherein said apparatus customizes the features of the content based on prestored profile information, wherein the prestored profile information includes capabilities and functions of said apparatus, and wherein the apparatus permanently stores the customized content in the apparatus.

24. The apparatus according to claim 15, wherein, in response to a determination that the received input corresponds to a request to purchase said content, receiving, at the apparatus, an offer for one or more selectable items of content.

25. The apparatus according to claim 24, further including receiving, at the apparatus, a selection of an item of content from the one or more selectable items of content, wherein the selected item of content is permanently stored in said apparatus.

26. The apparatus according to claim 25, wherein said apparatus customizes the features of the selected item of content based on prestored profile information, wherein the prestored profile information includes capabilities and functions of said apparatus, and permanently stores the customized selected item of content.

27. The apparatus according to claim 15, wherein the user of the terminal is permitted to implement business methods based on the superdistribution of content in the telecommunications network.

* * * * *

UNITED STATES PATENT AND TRADEMARK OFFICE
CERTIFICATE OF CORRECTION

PATENT NO. : 7,505,760 B2  
APPLICATION NO. : 09/977696  
DATED : March 17, 2009  
INVENTOR(S) : Leon Hurst et al.

Page 1 of 1

It is certified that error appears in the above-identified patent and that said Letters Patent is hereby corrected as shown below:

In Column 14, Claim 15, Line 7:
    Please delete "instruction" and insert --instructions--

In Column 14, Claim 15, Line 8:
    Please delete "process" and insert --processor--

Signed and Sealed this

Fifteenth Day of September, 2009

David J. Kappos
*Director of the United States Patent and Trademark Office*